(12) United States Patent
Nakamura

(10) Patent No.: US 9,952,069 B2
(45) Date of Patent: Apr. 24, 2018

(54) TIPPING INDICATOR AND PACKING BOX INCLUDING THE SAME

(71) Applicant: KYOCERA Document Solutions Inc., Osaka (JP)

(72) Inventor: Toshiyuki Nakamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 200 days.

(21) Appl. No.: 14/906,049

(22) PCT Filed: Apr. 10, 2015

(86) PCT No.: PCT/JP2015/061241
§ 371 (c)(1),
(2) Date: Jan. 19, 2016

(87) PCT Pub. No.: WO2015/166786
PCT Pub. Date: Nov. 5, 2015

(65) Prior Publication Data
US 2016/0161297 A1 Jun. 9, 2016

(30) Foreign Application Priority Data

Apr. 28, 2014 (JP) ................. 2014-092411
May 27, 2014 (JP) ................. 2014-108797

(51) Int. Cl.
*G01D 7/00* (2006.01)
*B65D 79/02* (2006.01)
*G01P 15/06* (2006.01)

(52) U.S. Cl.
CPC ............. *G01D 7/005* (2013.01); *B65D 79/02* (2013.01); *G01P 15/06* (2013.01)

(58) Field of Classification Search
CPC ....... G01D 7/005; B65D 79/02; G01P 15/036; G01K 11/06; G01K 11/12; G01K 11/16; G01K 11/22
(Continued)

(56) References Cited

U.S. PATENT DOCUMENTS 3,207,122 A 9/1965 Salembier
3,243,303 A * 3/1966 Johnson ................... G01K 3/04
116/207

(Continued)

FOREIGN PATENT DOCUMENTS

| JP | 2005-530160 A | 10/2005 |
| JP | 2010-085132 A | 4/2010 |
| JP | 2014-043245 A | 3/2014 |

OTHER PUBLICATIONS

International Search Report—PCT/JP2015/061241 dated May 19, 2015.

*Primary Examiner* — Peter Macchiarolo
*Assistant Examiner* — Irving A Campbell
(74) *Attorney, Agent, or Firm* — Studebaker & Brackett PC

(57) ABSTRACT

A tipping indicator (10) for fixing to a side surface of a packing box (1) includes an ink bag (11), an ink absorber (12), and an outer bag (13). The ink bag (11) includes an ink chamber (11*a*) internally filled with an ink (G). The ink absorber (12) is ink absorptive and has a different color from the ink (G). The outer bag (13) is formed from a film within which the ink bag (11) and the ink absorber (12) are enclosed. At least part of the outer bag (13) has a visual confirmation region (R3) in which the ink absorber (12) is visible.

14 Claims, 17 Drawing Sheets

(58) Field of Classification Search
USPC .................... 73/762; 116/203, 206, 212, 215
See application file for complete search history.

(56) References Cited

U.S. PATENT DOCUMENTS

| | | |
|---|---|---|
| 4,340,008 A | 7/1982 | Mendelson |
| 6,367,408 B1 | 4/2002 | Gu |
| 2014/0290561 A1* | 10/2014 | Noguchi ............... G01L 5/0052 116/203 |

* cited by examiner

TIPPING INDICATOR AND PACKING BOX INCLUDING THE SAME

TECHNICAL FIELD

The present invention relates to a tipping indicator that detects tipping of a manufactured article, such as an electronic device, during transportation or storage of the manufactured article, and also relates to a packing box including the tipping indicator.

BACKGROUND ART

Conventionally, in a situation in which a manufactured article, such as an electronic device, is packaged using a packing box, such as a corrugated cardboard case, a typically used method involves providing cushioning between the packing box and the manufactured article (packed article) in order to absorb external impact and vibrations during transportation. The cushioning can be, for example, folded corrugated cardboard or molded pulp cushioning that is recyclable and that is made using waste paper as a material.

Although packing may weaken the impact in a situation in which a packing box tips during transportation or storage of a manufactured article packed therein, or in which the packing box is transported in a sideways state, some of the impact is still transmitted internally. Therefore, the manufactured article inside the packing box may be damaged even if the packing box itself is not damaged. In such a situation, damage to the manufactured article is not confirmed until the packing box is opened. Therefore, it is difficult to determine whether the damage occurred during manufacture of the manufactured article, or whether the damage occurred during transportation or storage of the manufactured article.

PTL 1 discloses impact sensor-equipped cushioning that includes a solution in a supersaturated state, and first and second packing materials that contain the solution. In the aforementioned impact sensor-equipped cushioning, the solution visibly changes state upon receiving external force from an impact, vibrations, etc., enabling visual confirmation that the external force has been received.

CITATION LIST

Patent Literature

[PTL 1]
Japanese Patent Application Laid-Open Publication No. 2010-085132

SUMMARY OF INVENTION

Technical Problem

However, the impact sensor-equipped cushioning disclosed in PTL 1 suffers from a problem of increased cushioning weight because the solution needs to be provided throughout all regions of the cushioning.

Furthermore, in order to prepare the supersaturated solution during manufacturing, a solvent is adjusted to a specific temperature through heating, a solute is added to the solvent, and the solvent and solute are stirred. Subsequent filling of the solution into a protrusion part of the first packing material and sealing through adhesion of the second packing material is required. Therefore, complication of the manufacturing process and increased manufacturing costs are also problematic.

The present invention was conceived in order to solve the problems described above. An objective of the present invention is to provide a tipping indicator that can detect tipping, etc., of a packing box through a simple configuration and a packing box including the tipping indicator.

Solution to Problem

In order to achieve the above objective, a tipping indicator according to the present invention is for fixing to a side surface of a packing box and includes an ink bag, an ink absorber, and an outer bag. The ink bag includes an ink chamber internally filled with an ink. The ink absorber is ink absorptive and has a different color from the ink. The outer bag is formed by a film within which the ink bag and the ink absorber are enclosed. At least part of the outer bag has a visual confirmation region in which the ink absorber is visible.

Advantageous Effects of Invention

According to the present invention, the ink bag ruptures and the ink leaks out of the ink bag when the packing box tips during transportation or storage of the packing box, or when the packing box is transported in a sideways state. The ink absorber changes color upon absorbing the ink. Therefore, it is possible to determine that tipping, etc., of the packing box has occurred, even if the packing box is subsequently returned to an original state. In addition, in a situation in which a manufactured article (packed article) inside the packing box is damaged, it is easy to determine that the damage has occurred during distribution or storage.

Furthermore, a simpler configuration can be implemented than that of the impact sensor-equipped cushioning disclosed in PTL 1.

DESCRIPTION OF EMBODIMENTS

Figure 1:
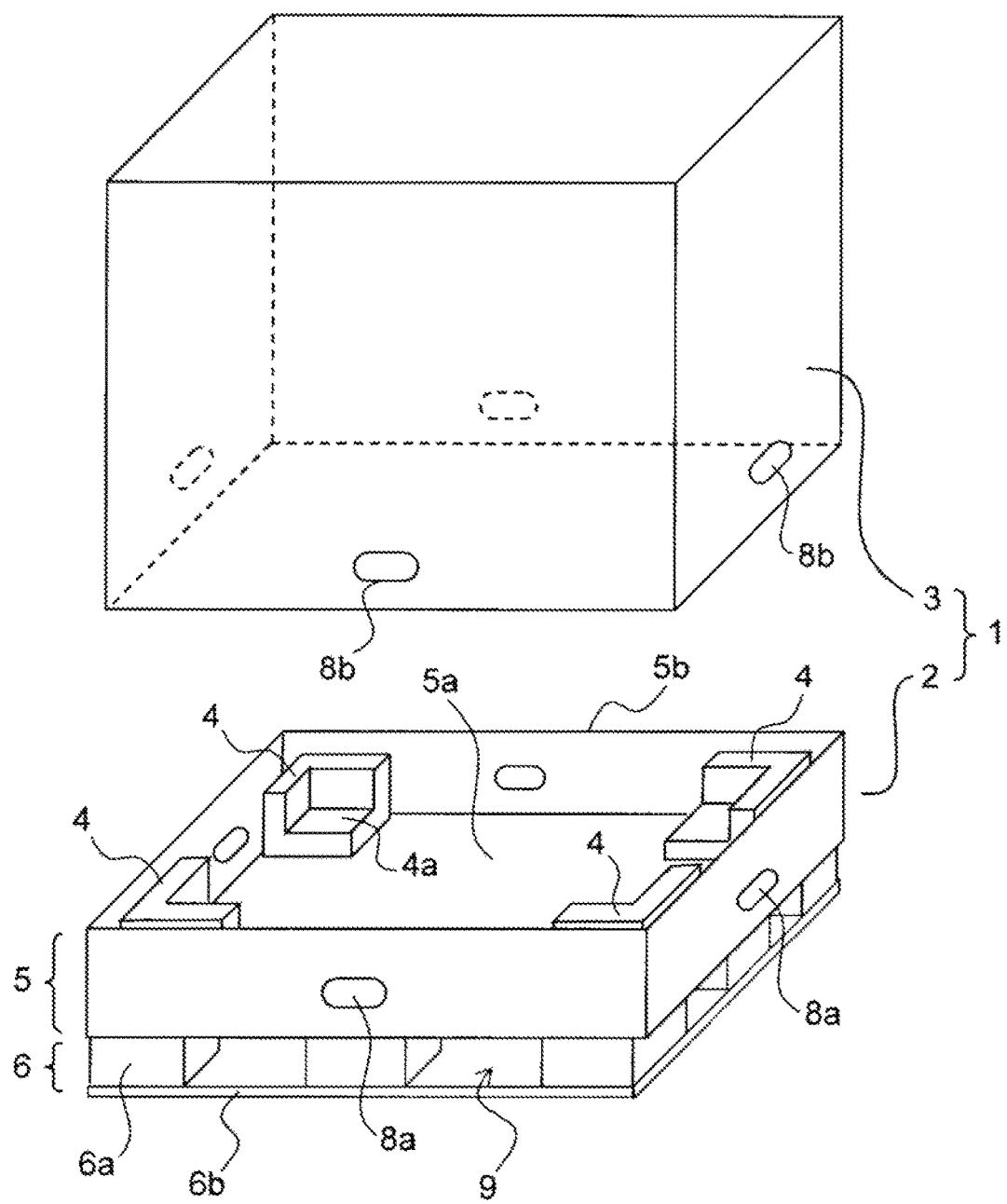
FIG. 1 is an exploded perspective view illustrating an example of a packing box to which a tipping indicator according to the present invention is fixed.

The following explains embodiments of the present invention with reference to the drawings.

First, a packing box 1 to which a tipping indicator 10 (20) according to the present invention is attached, is explained with reference to FIG. 1.

The packing box 1 includes a tray-equipped palette 2, an upper box 3, and cushioning 4. The upper box 3 is a box that has an open bottom surface and also side and top surfaces that cover a packed article (manufactured article). The cushioning 4 is located on the palette 2 and is corrugated cardboard material that protects the packed article from external impact. The cushioning 4 has a manufactured article loading surface 4a that matches a shape of the packed article.

The tray-equipped palette 2 includes a tray 5 and a palette 6. The tray 5 has a bottom surface 5a on which the packed article (not illustrated) is loaded and a side wall 5b that stands upright along a periphery of the bottom surface 5a. The palette 6 is fixed to a lower surface of the tray 5. The cushioning 4 is located at four corners of the bottom surface 5a, separated from the side wall 5b by a specific gap. Through holes 8b are formed in a lower part of the upper box 3 at positions overlapping with through holes 8a in the side wall 5b. The tray-equipped palette 2 is connected to the upper box 3 by inserting a fastener with the through holes 8a and 8b overlapping; the fastener is not illustrated in the drawing.

Raised parts (not illustrated) that are provided on the bottom surface 5a are inserted into a lower surface of the cushioning 4. The raised parts fix each piece of the cushioning 4 in position so that the cushioning 4 does not become shifted in a horizontal direction. Note that the cushioning 4 may be fixed to the bottom surface 5a by a different method such as through adhesion.

The palette 6 includes a plurality of struts 6a, a top plate (not illustrated), and a bottom plate 6b. The struts 6a are for example formed from folded corrugated cardboard. The top plate is fixed to an upper surface of each of the struts 6a and the bottom plate 6b is fixed to a lower surface of each of the struts 6a. Arm insertion holes 9 through which an arm of a forklift truck or a hand lift (cart for palette conveyance) can be inserted are formed between the struts 6a.

The following explains a procedure for packing a manufactured article using the packing box 1 illustrated in FIG. 1. First, the manufactured article (not illustrated) is placed on the manufactured article loading surface 4a of the cushioning 4 located on the bottom surface 5a of the tray-equipped palette 2. Next, after further cushioning has been placed on the side and top surfaces of the manufactured article as necessary, the manufactured article is covered by the upper box 3.

Finally, the tray-equipped palette 2 is connected to the upper box 3 through insertion of fasteners 7 (refer to FIGS. 2 and 11) in a state in which the through holes 8a of the side wall 5b and the through holes 8b of the upper box 3 are overlapping. Use of the packing box 1 facilitates packing and transport—particularly of large manufactured articles and the like—because it is not necessary to load the packing box 1 onto a palette after packing of the manufactured article.

<Tipping Indicator 10 According to First Embodiment>

Figure 2:
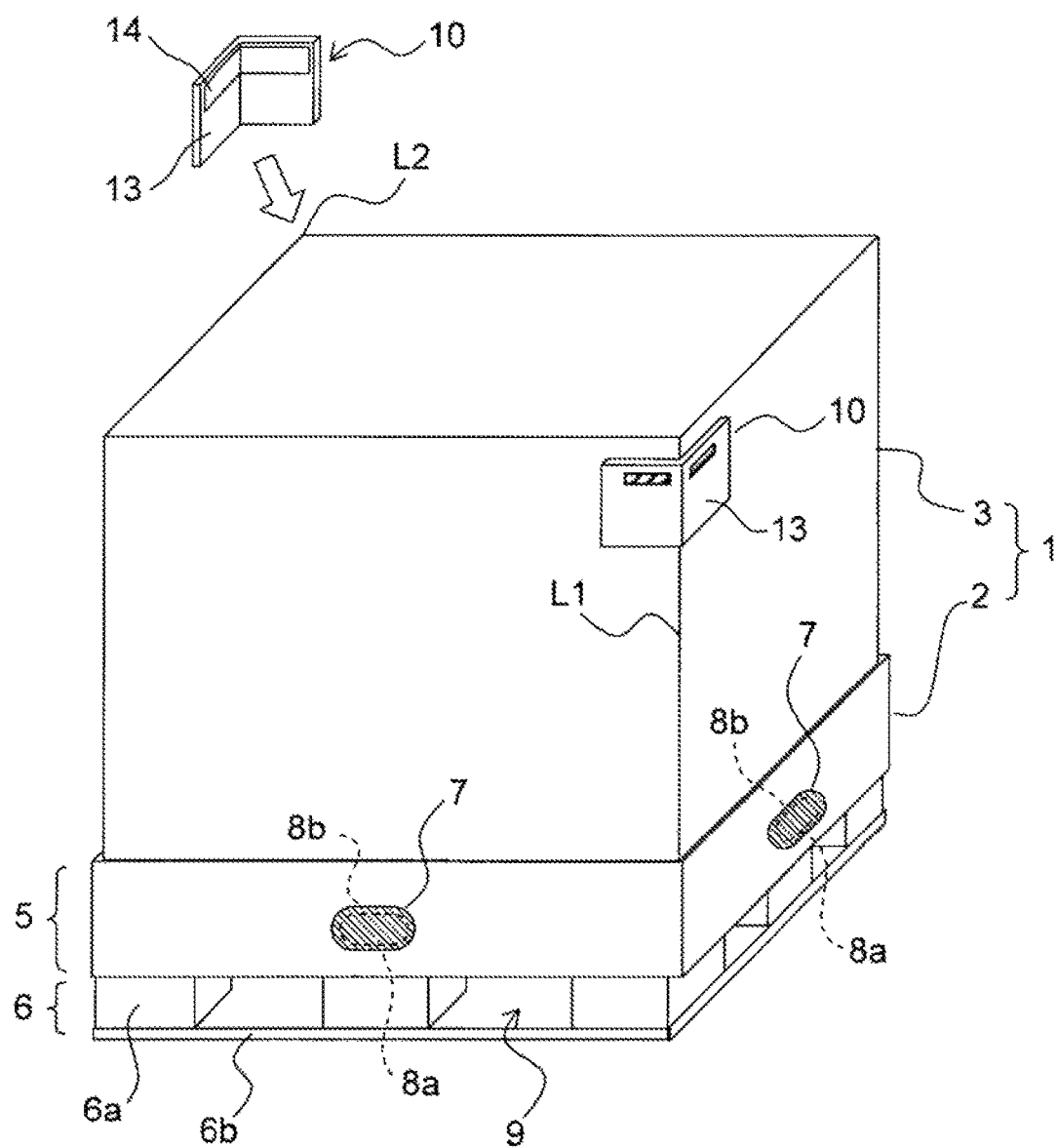
FIG. 2 is a perspective view illustrating a state in which a manufactured article (packed article) is packed in the packing box shown in FIG. 1 and a tipping indicator according to a first embodiment of the present invention is fixed to the packing box.
Figure 3:
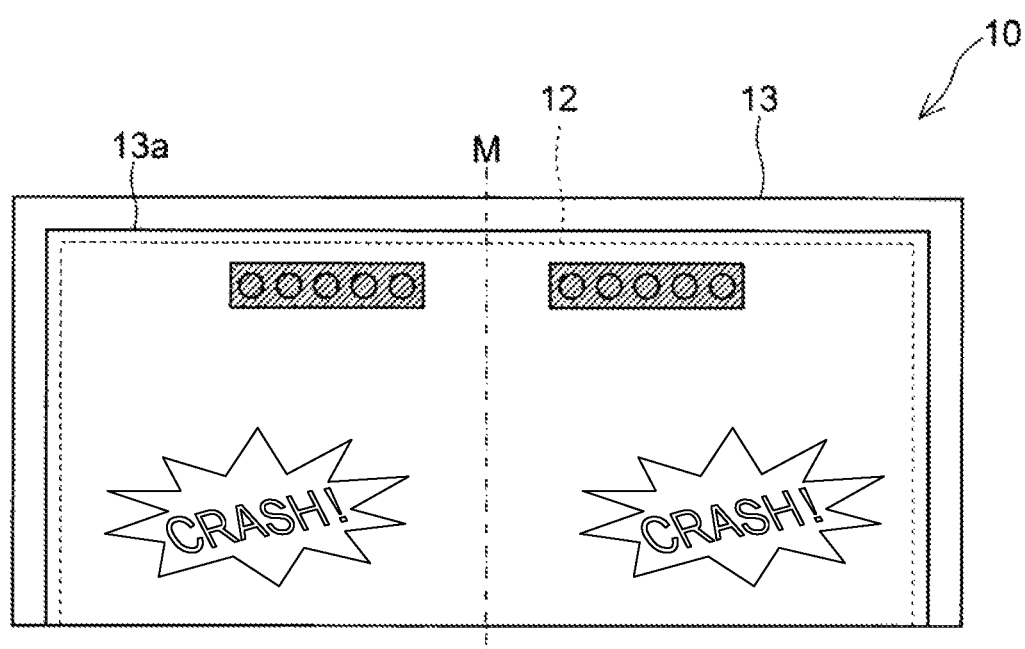
FIG. 3 is a front view illustrating structure of the tipping indicator according to the first embodiment shown in FIG. 2.
Figure 4:
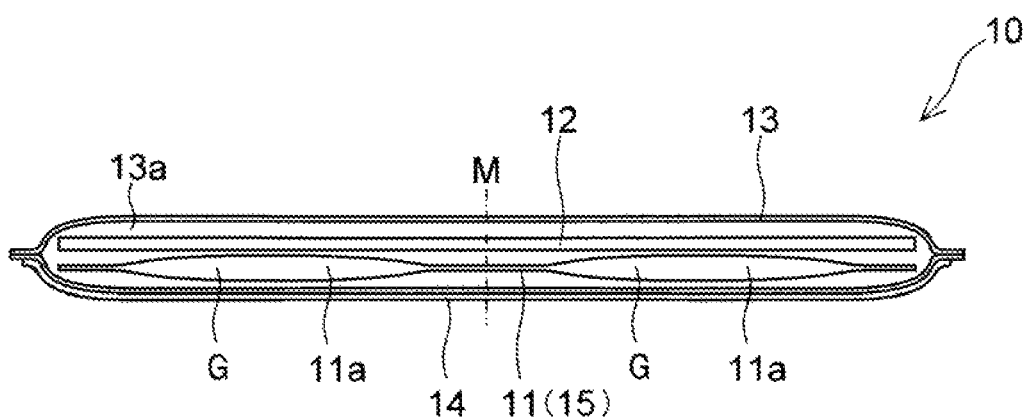
FIG. 4 is a cross-sectional view illustrating structure of the tipping indicator according to the first embodiment shown in FIG. 2.
Figure 5:
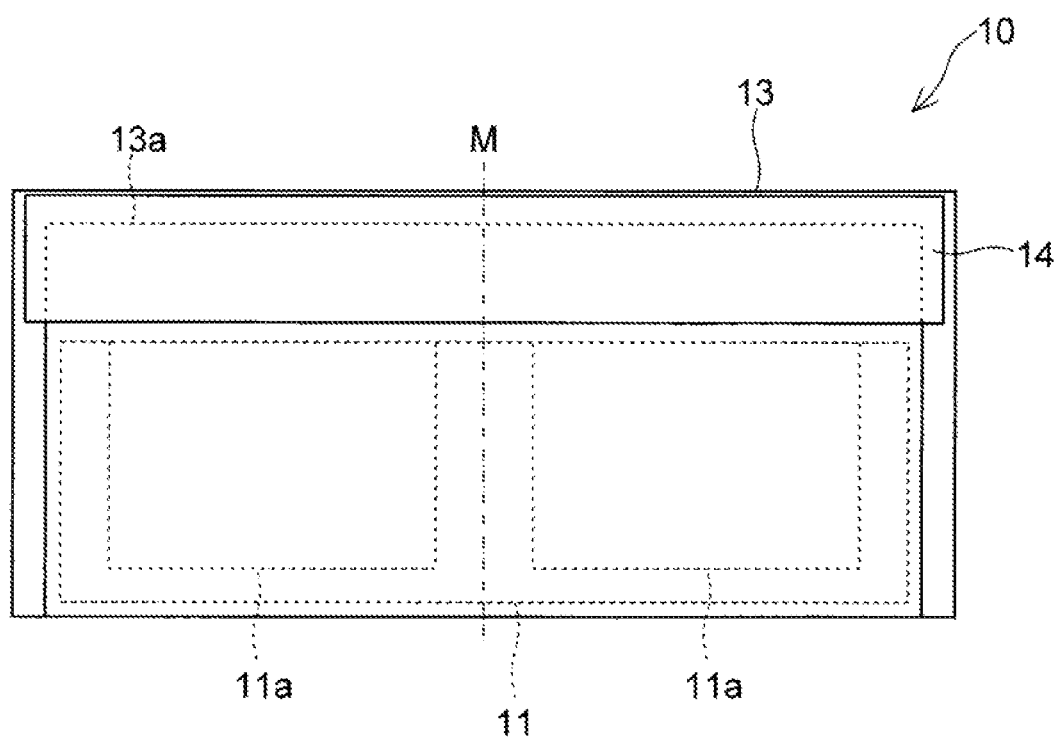
FIG. 5 is a rear view illustrating structure of the tipping indicator according to the first embodiment shown in FIG. 2.

Next, an explanation of the tipping indicator 10 according to the first embodiment that is fixed to the packing box 1 is provided with reference to FIGS. 2-9. As illustrated in FIGS. 3-5, the tipping indicator 10 includes an ink bag 11, an ink absorber 12, and an outer bag 13. The ink bag 11 includes ink chambers 11a that are internally filled with an ink G. The ink absorber 12 is ink absorptive. The outer bag 13 internally encloses the ink bag 11 and the ink absorber 12. The ink bag 11, the ink absorber 12, and the outer bag 13 are flexible and are foldable into an L-shape.

Figure 6:
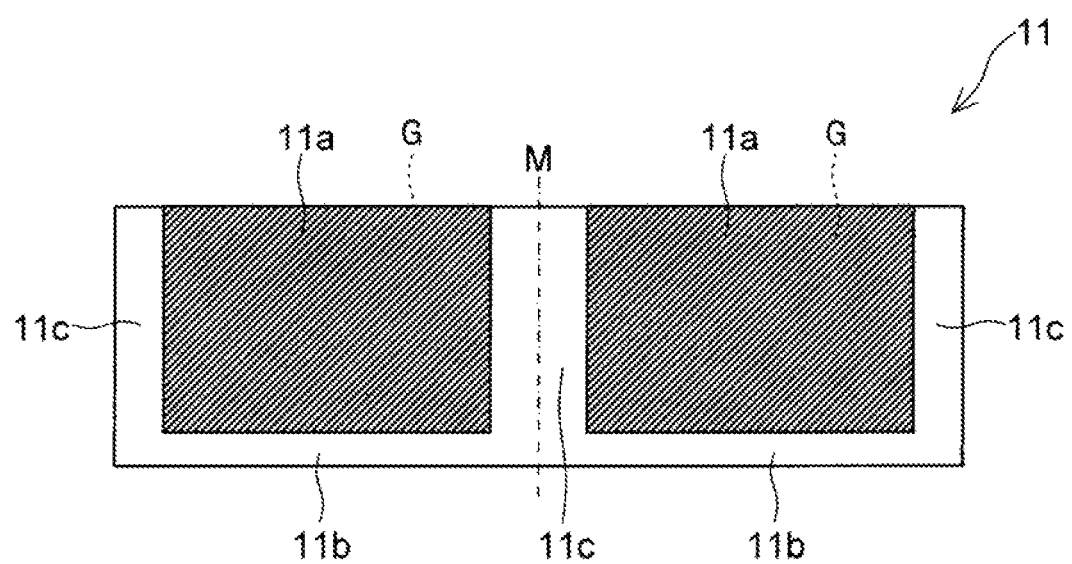
FIG. 6 is a front view illustrating structure of an ink bag of the tipping indicator according to the first embodiment shown in FIG. 2.

With reference to FIG. 6, the ink bag 11 is for example formed by a film made from a thermoplastic resin such as polyethylene, and has a substantially rectangular shape that is elongated in a specific direction (left-right direction in FIG. 6). The ink bag 11 is for example transparent. The ink G is for example red. Consequently, the ink G is visible from outside of the ink bag 11. Note that the ink bag 11 does not have to be transparent and may be semi-transparent or opaque, and may be subjected to printing on a surface thereof. The ink G (ink chambers 11a) is indicated by hatching in FIG. 6.

The ink chambers 11a internally filled with the ink G are provided separately on both sides—that is, one on each side—of a folding position M (central part in a longitudinal direction (left-right direction)) in the longitudinal direction. An upper edge of each of the ink chambers 11a (one edge extending in the longitudinal direction) is formed by folding back of the film. A lower edge of each of the ink chambers 11a (other edge extending in the longitudinal direction) is formed by a sealing part 11b at which the film is sealed by heat sealing. Left and right edges of each of the ink chambers 11a (edges extending in a lateral direction) are formed by sealing parts 11c at which the film is sealed by heat sealing.

The sealing parts 11b are weak sealing sections that have a weaker sealing strength than the sealing parts 11c. More specifically, the sealing parts 11b are heat sealed at a lower temperature than the sealing parts 11c. For example, the sealing parts 11b are heat sealed at approximately 120° C. and the sealing parts 11c are heat sealed at approximately 140° C. Therefore, the ink bag 11 ruptures at the sealing parts 11b in response to application of external pressure on the ink bag 11.

The ink bag 11 has a weaker rupture strength than the outer bag 13. More specifically, at least the sealing parts 11b of the ink bag 11 have a weaker sealing strength than a sealing part 13b (refer to FIG. 8) of the outer bag 13 explained further below. In other words, the ink bag 11 and the outer bag 13 are formed such that, in a situation in which tipping, etc., of the packing box 1 occurs, the ink bag 11 ruptures and the ink G leaks out, but the outer bag 13 does not rupture. Therefore, the ink G can be prevented from leaking out of the outer bag 13. Consequently, contamination of the packing box 1 by the ink G can be prevented.

A manufacturing method of the ink bag 11 involves folding back a film extending in the specific direction (longitudinal direction) at a central part thereof in the lateral direction (part that becomes the upper edges of the ink chambers 11a) and subsequently heat sealing a part that becomes the lower edges of ink chambers 11a in order to form the sealing parts 11b. A tube-shaped film is formed as a result. Next, the sealing parts 11c and the ink chambers 11a are formed by filling an inner part of the film with the ink G while performing heat sealing at specific intervals in the longitudinal direction. Subsequently, the sealing parts 11c are cut for each set of two intervals to manufacture the ink bag 11 including the two ink chambers 11a.

Figure 7:
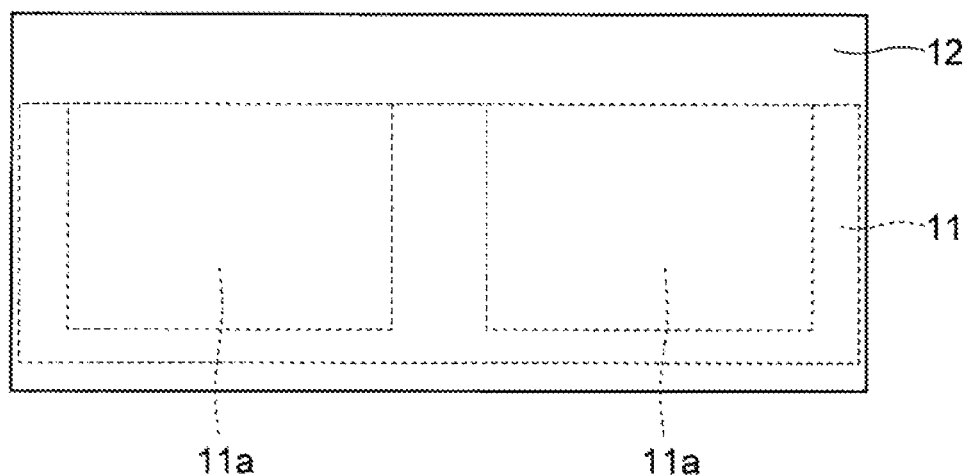
FIG. 7 is a front view illustrating a state in which an ink absorber is located on a front surface side of the ink bag of the tipping indicator according to the first embodiment shown in FIG. 2.

As illustrated in FIGS. 3 and 4, the ink absorber 12 is located on a front surface side of the ink bag 11 (near side in FIG. 3 and upper side in FIG. 4). The ink absorber 12 is the same size or larger than the ink bag 11 and is located on both sides in the left-right direction such as to span across the folding position M. The ink absorber 12 is formed from a material that can absorb the ink G (for example, a non-woven fabric). The ink absorber 12 has a different color from the ink G. In other words, the ink absorber 12 is for example a color such as white that enables easy confirmation of a change of color when the ink absorber 12 absorbs the ink G. As a result of the ink absorber 12 being a color such as white, the color of the ink G in the ink bag 11 is barely recognizable when viewed from a side corresponding to the ink absorber 12 as illustrated in FIG. 7.

Figure 8:
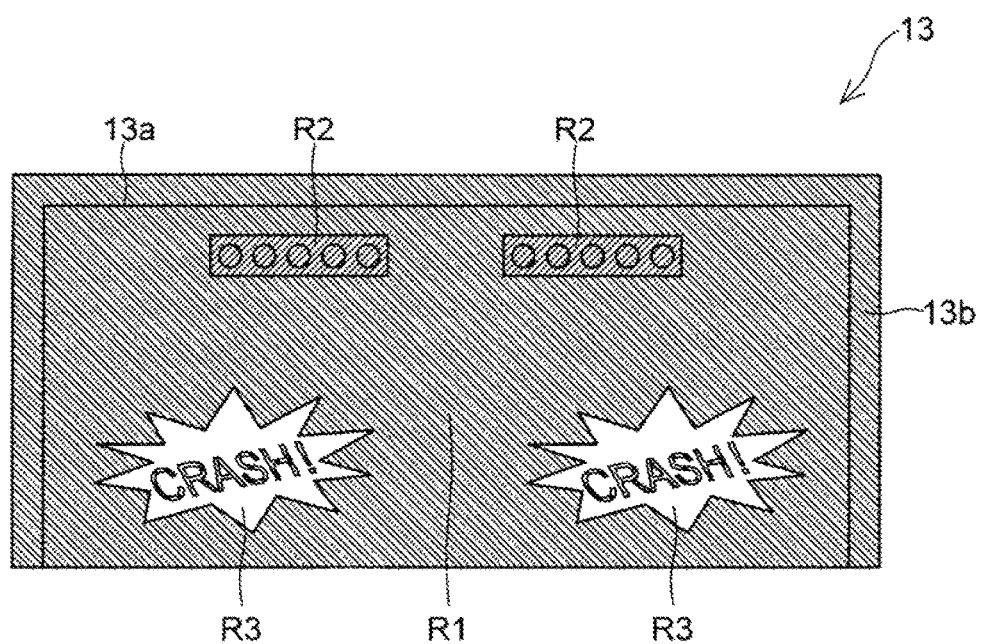
FIG. 8 is a front view illustrating structure of an outer bag of the tipping indicator according to the first embodiment shown in FIG. 2.

The outer bag 13 is for example formed from a transparent or semi-transparent film in which a thermoplastic resin layer is laminated onto the surface of a base material formed from PET (polyethylene terephthalate). The outer bag 13 has a substantially rectangular shape that is elongated in the specific direction (left-right direction in FIG. 3). As illustrated in FIG. 4, the outer bag 13 has a storage chamber 13a in which the ink bag 11 and the ink absorber 12 are enclosed. As illustrated in FIG. 8, a lower edge of the storage chamber 13a (one edge extending in the longitudinal direction) is formed by folding back of the film. Upper, left, and right edges of the storage chamber 13a are formed by a sealing part 13b at which the film is sealed by heat sealing. In the manner described above, the storage chamber 13a is sealed with the ink bag 11 and the ink absorber 12 stored therein.

A front surface of the outer bag 13 is subjected to specific printing as illustrated in FIG. 8. Note that a region that is subjected to printing is indicated by hatching in FIG. 8. More specifically, a region R1 (printed region) that occupies the majority of the front surface of the outer bag 13 is printed on with substantially the same color as the ink absorber 12 (herein, white). Regions R2 and regions R3 are provided on the front surface of the outer bag 13 on both sides in the longitudinal direction (left-right direction). The regions R2 are printed on with a different color from the region R1. The regions R3 are not subjected to printing. The regions R2 have, for example, a company name or logo printed therein. The regions R3 are regions in which the ink absorber 12 is visible. The regions R3 are equivalent to an example of the "visual confirmation region". Each of the regions R3 includes a part therein that has been subjected to printing of substantially the same color as the ink absorber 12. For example, characters or symbols that attract attention (herein, the characters "CRASH!") are printed.

Double-sided adhesive tape 14 is attached to a rear surface of the outer bag 13 as illustrated in FIG. 5. The double-sided adhesive tape 14 adhesively fixes the tipping indicator 10 to a side surface of the packing box 1 (refer to FIG. 2).

As illustrated in FIG. 2, a pair of the tipping indicators 10 is fixed to opposite corners of the packing box 1. The tipping indicators 10 are each folded into an L-shape such that the tipping indicators 10 respectively span across opposite ridge lines L1 and L2 of the packing box 1 (upper box 3). When the packing box 1 is to be transported, an arm of a forklift truck or a hand lift is inserted into the arm insertion holes 9 in the tray-equipped palette 2, and the packing box 1 is then lifted up and transported.

Figure 9:
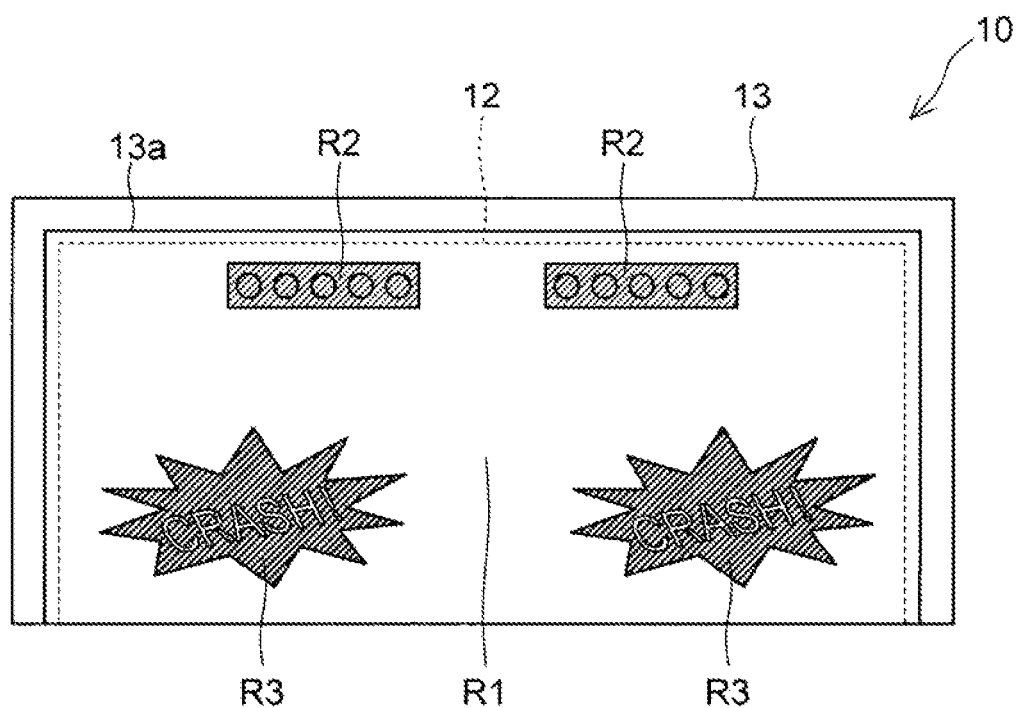
FIG. 9 is a front view illustrating a state in which ink leaks from the ink bag of the tipping indicator according to the first embodiment shown in FIG. 2 and in which regions R3 of the outer bag change color.

In a situation in which, during transportation, the packing box 1 for some reason falls from the forklift truck or the hand lifter and tips, pressure is applied on one of the tipping indicators 10, the ink bag 11 ruptures, and the ink G leaks out of the ink bag 11. When the above occurs, the ink G that leaks out of the ink bag 11 is absorbed by the ink absorber 12, causing the ink absorber 12 to change color, for example from white to red. As illustrated in FIG. 9, because the regions R3 of the outer bag 13 change color, for example from white to red, the characters printed in the regions R3 (for example, the characters "CRASH!") become clearly visible.

In the first embodiment, the tipping indicator 10 includes the ink bag 11, the ink absorber 12, and the outer bag 13 as explained above. The ink bag 11 is internally filled with the ink G. The ink absorber 12 is ink absorptive and has a different color from the ink G. The outer bag 13 is formed from a film within which the ink bag 11 and the ink absorber 12 are enclosed. The outer bag 13 has the regions R3 in which the ink absorber 12 is visible. Therefore, the ink bag 11 ruptures and the ink G leaks from the ink bag 11 in a situation in which the packing box 1 tips during transportation or storage, or in which the packing box 1 is transported in a sideways state. The ink absorber 12 then absorbs the ink G and changes color. Consequently, it is possible to determine that tipping, etc., of the packing box 1 has occurred, even if the packing box 1 is subsequently lifted and returned to an original state. Therefore, in a situation in which the manufactured article (packed article) inside the packing box 1 is damaged, it is easy to determine that the damage to the manufactured article (packed article) has occurred during transportation or storage.

Furthermore, the tipping indicator 10 can be configured by the ink bag 11, the ink absorber 12, and the outer bag 13. Therefore, compared to the impact sensor-equipped cushioning disclosed in PTL 1, a simple configuration can be implemented through a simplified production process and with reduced production costs. In addition, a reduction in weight can be achieved because it is not necessary to provide a solution throughout cushioning.

As a result of the tipping indicator 10 being fixed to the side surface of the packing box 1, a person transporting the packing box 1 can recognize that the tipping indicator 10 is present. Therefore, it is expected that an accident is less likely to occur during transportation because the person transporting the packing box 1 will handle the packing box 1 more carefully.

As explained above, the ink bag 11 includes the sealing parts 11b and 11c that seal the periphery of the ink chamber 11a. The sealing parts 11b are weak sealing sections that have a weaker sealing strength than the sealing parts 11c. Therefore, the ink bag 11 reliably ruptures at the sealing parts 11b when tipping, etc., of the packing box 1 occurs.

As explained above, the outer bag 13 has the region R1 that had been subjected to printing and that is adjacent to the regions R3 in which the ink absorber 12 is visible. In addition, at least a part of the region R1 that borders the regions R3 has substantially the same color as the ink absorber 12 (the entirety of the region R1 in the present embodiment). Consequently, in a state in which the ink absorber 12 has not changed color (i.e., a state in which tipping, etc., of the packing box 1 has not occurred), boundaries between the region R1 and the regions R3 are difficult to recognize, and the region R1 and the regions R3 appear to be a single region. Furthermore, in a state in which the ink absorber 12 has changed color (i.e., a state in which tipping, etc., of the packing box 1 has occurred), the regions R3 change color to a different color from the region R1 such that the regions R3 are visually emphasized. Therefore, reliable visual confirmation that tipping, etc., of the packing box 1 has occurred is possible.

As explained above, each of the regions R3 includes a part therein that has been subjected to printing of substantially the same color as the ink absorber 12. Therefore, in a state in which the ink absorber 12 has changed color (i.e., a state in which tipping, etc., of the packing box 1 has occurred), printing of a different color to the regions R3 (for example, characters or symbols that attract attention) becomes clearly visible in the regions R3. Therefore, reliable visual confirmation that tipping, etc., of the packing box 1 has occurred is possible.

As explained above, the ink absorber 12 is made from a non-woven fabric. Therefore, the ink absorber 12 is light and can be made cheaply.

As explained above, the ink bag 11, the ink absorber 12, and the outer bag 13 are foldable into an L-shape. Therefore, a single tipping indicator 10 can be fixed to two adjacent side surfaces of the packing box 1. Consequently, the single tipping indicator 10 can detect tipping, etc., in two different directions.

In the present embodiment, the pair of tipping indicators 10 is fixed to opposite corners of the packing box 1 such that the tipping indicators 10 respectively span across the opposite ridge lines L1 and L2 of the packing box 1. Therefore, the tipping indicators 10 are fixed to all four side surfaces of the packing box 1. Consequently, one of the tipping indicators 10 is ruptured whichever of the side surfaces of the packing box 1 is underneath when the packing box 1 tips, and a trace that an impact has occurred is reliably left in one of the tipping indicators 10 irrespective of which direction the packing box 1 tips in.

As explained above, the ink chambers 11a are located separately on both sides of the folding position M. Therefore, it is possible to prevent load being applied on the ink chambers 11a and rupturing of the ink chambers 11a during folding of the ink bag 11, and thus a false detection of tipping, etc., of the packing box 1 can be prevented. As the ink chambers 11a are located separately on both sides of the folding position M, it is possible to determine which direction the packing box 1 has tipped in by checking which of the ink chambers 11a has ruptured.

As explained above, the ink absorber 12 spans across the folding position M. Therefore, it is possible to confirm that tipping, etc., of the packing box 1 has occurred from either of two adjacent side surfaces of the packing box 1 because the ink absorber 12 changes color across the two adjacent side surfaces of the packing box 1.

Note that the presently disclosed first embodiment is merely an example in all aspects and should not be construed to be limiting. The scope of the present invention is indicated by the claims, rather than by the above-described first embodiment, and includes all variations that are equivalent in meaning and scope to the claims.

Although the above first embodiment is explained for an example in which only one edge of each of the ink chambers 11a has a weak sealing strength, the present invention is not limited to such an example. Two, three, or four edges of each of the ink chambers 11a may alternatively have a weak sealing strength.

Figure 10:
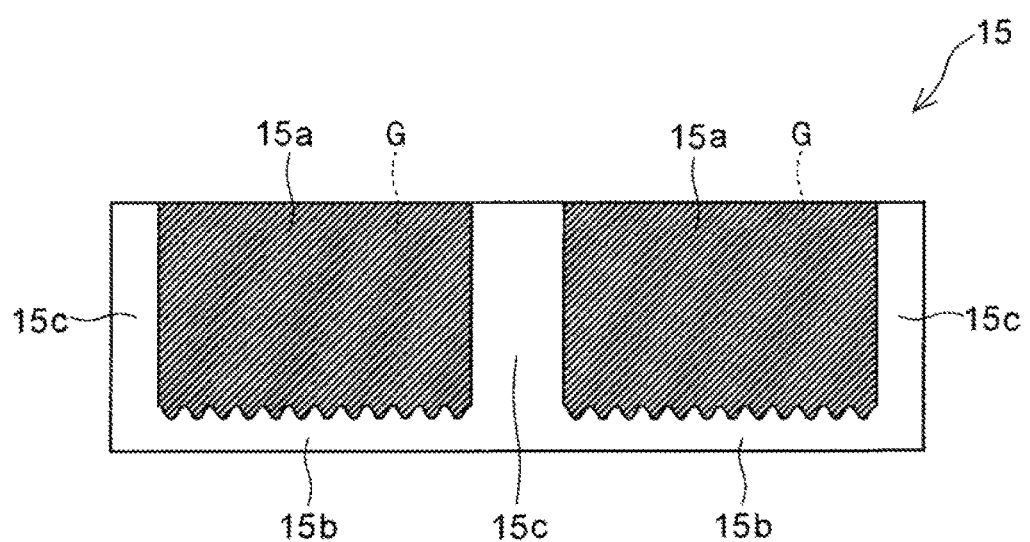
FIG. 10 is a front view illustrating structure of a variation of the ink bag according to the first embodiment shown in FIG. 2.

Although the above embodiment is explained for an example in which the sealing strength of the sealing part 11b is weakened through heat sealing at a low temperature, the present invention is not limited to such an example. The sealing strength of a sealing part can alternatively be weakened through the type of film or the shape of the sealing part. For example, in an ink bag 15 according to a variation of the present invention illustrated in FIG. 10, sealing parts 15b have a weaker sealing strength because the sealing parts 15b are wave-shaped. Therefore, rupturing can occur more reliably at the sealing parts 15b when tipping, etc., of the packing box 1 occurs. The sealing strength of a sealing part can also be weakened through viscosity of the ink G. More specifically, during formation of sealing parts 15c, heat sealing is performed while pressing films together such that ink G present between the films is pushed out. The ink G is less readily pushed out from between the films in a situation in which the ink G has higher viscosity. Therefore, the sealing strength of the sealing parts 15c can be made approximately the same as or weaker than the sealing strength of the sealing parts 15b by using an ink G having higher viscosity.

Although the above first embodiment is explained for an example in which the periphery of each of the ink chambers 11a is sealed by heat sealing, the present invention is not limited to such an example. For example, the periphery of each of the ink chambers 11a may be sealed by a zipper (also referred to as a zip or a fastener) or the like. The sealing strength of a sealing part can also be easily weakened in such a situation.

Although the above embodiment is explained for an example in which one type of ink bag 11 is used, the present invention is not limited to such an example. For example, in a situation in which a plurality of different types of ink bags 11 having different rupture strengths are used and in which a different color ink G is used for each of the rupture strengths, the strength of impact can be determined based on which color the ink absorber 12 changes to.

Although the above first embodiment is explained for an example in which the front surface of the outer bag 13 has been subjected to printing, the present invention is not limited to such an example. The front surface of the outer bag 13 may alternatively not have been subjected to printing. In other words, the entire surface of the outer bag 13 may be transparent or semi-transparent.

Although the above first embodiment is explained for an example in which the ink chambers 11a are located separately on both sides of the folding position M, an ink chamber 11a that spans across the folding position M may alternatively be provided.

Although the above first embodiment is explained for an example in which the ink absorber 12 spans across the folding position M, ink absorbers 12 located separately on both sides of the folding position M may alternatively be provided.

A configuration obtained through appropriate combination of configurations of the first embodiment described above and the variation illustrated in FIG. 10 is also included in the technical scope of the present invention.

<Tipping Indicator 20 According to Second Embodiment>

Figure 11:
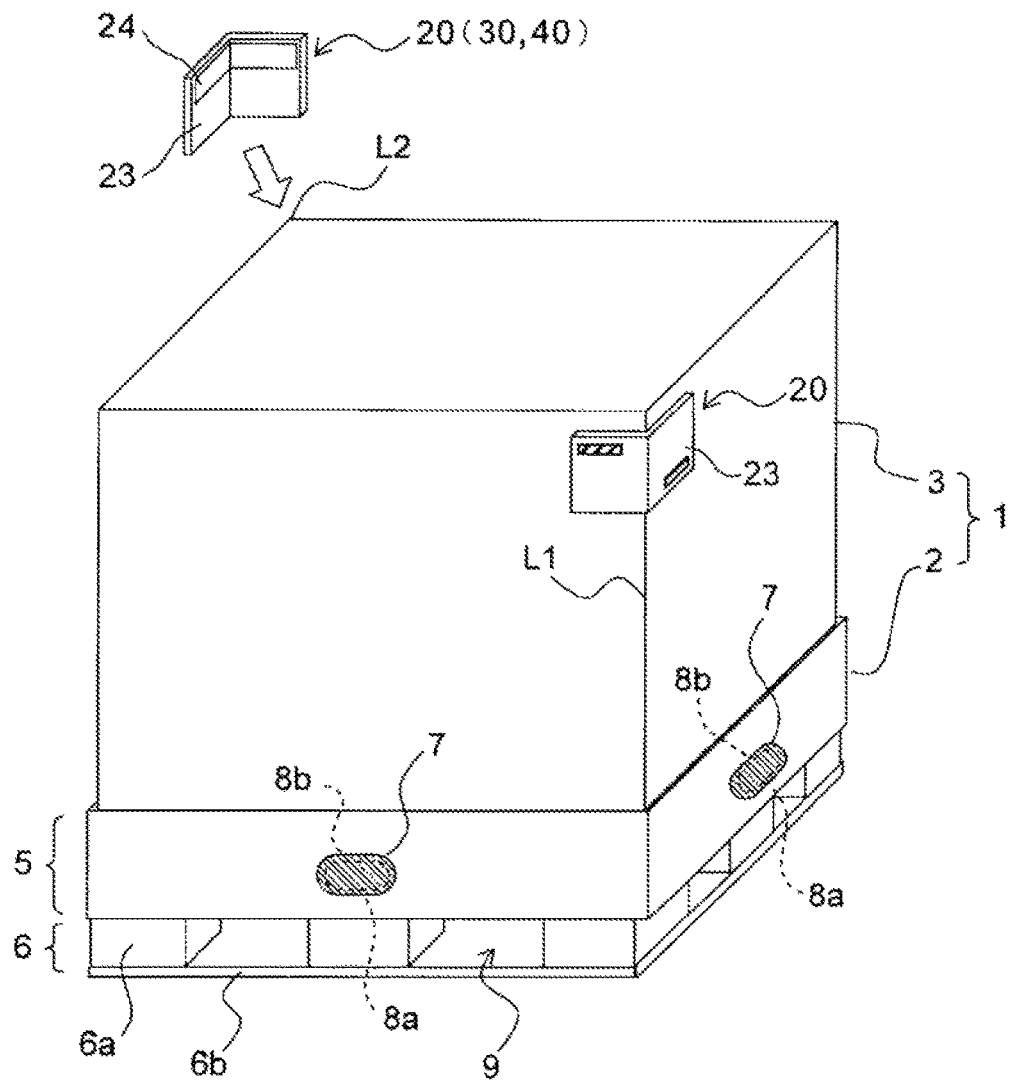
FIG. 11 is a perspective view illustrating a state in which a manufactured article (packed article) is packed in the packing box shown in FIG. 1 and a tipping indicator according to a second embodiment of the present invention is fixed to the packing box.
Figure 12:
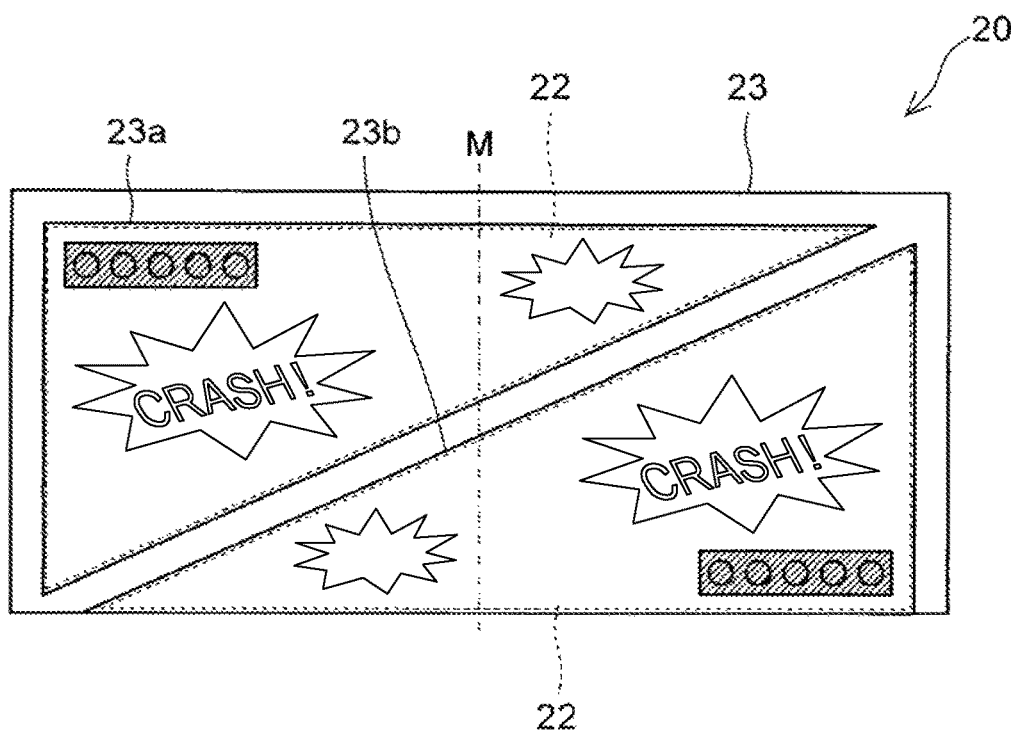
FIG. 12 is a front view illustrating structure of the tipping indicator according to the second embodiment shown in FIG. 11.
Figure 13:
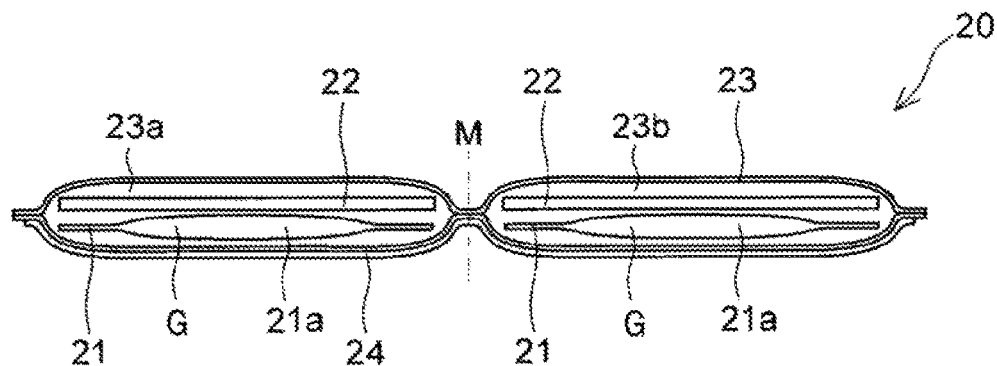
FIG. 13 is a cross-sectional view illustrating structure of the tipping indicator according to the second embodiment shown in FIG. 11.
Figure 14:
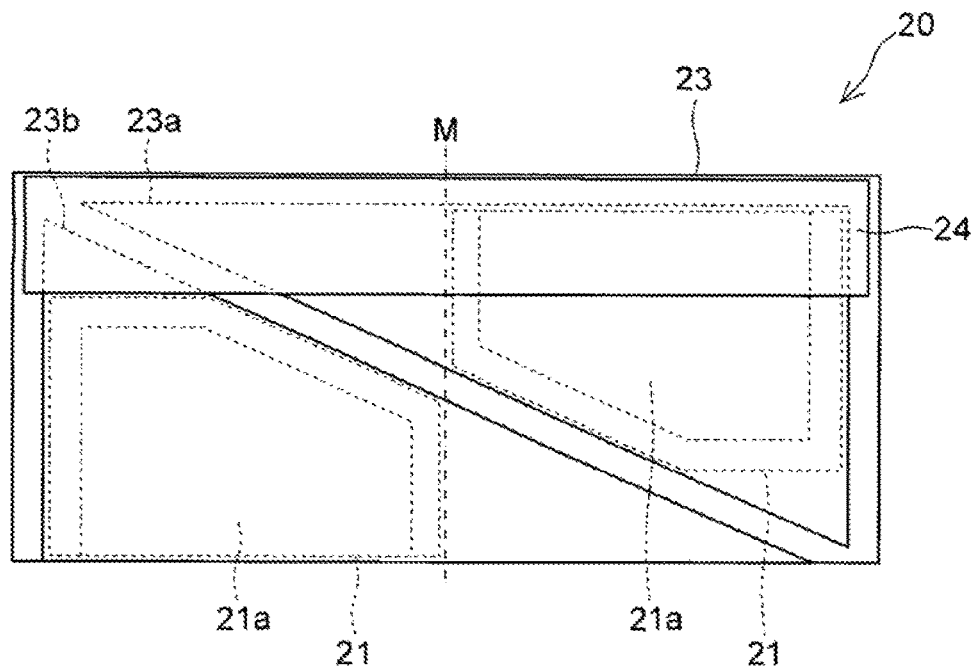
FIG. 14 is a rear view illustrating structure of the tipping indicator according to the second embodiment shown in FIG. 11.

Next, an explanation is provided for a tipping indicator 20 according to a second embodiment of the present invention that is fixed to a packing box 1. As illustrated in FIG. 11, the packing box 1 to which the tipping indicator 20 is fixed is the same as the packing box 1 illustrated in FIG. 2. As illustrated in FIGS. 12-14, the tipping indicator 20 includes ink bags 21, two ink absorber 22, and an outer bag 23. The ink bags 21 each include an ink chamber 21a internally filled with ink G. The ink absorbers 22 are ink absorptive. The outer bag 23 encloses the ink bags 21 and the ink absorbers 22 therein. The ink absorbers 22 and the outer bag 23 are flexible and can be folded into an L-shape.

Figure 15:
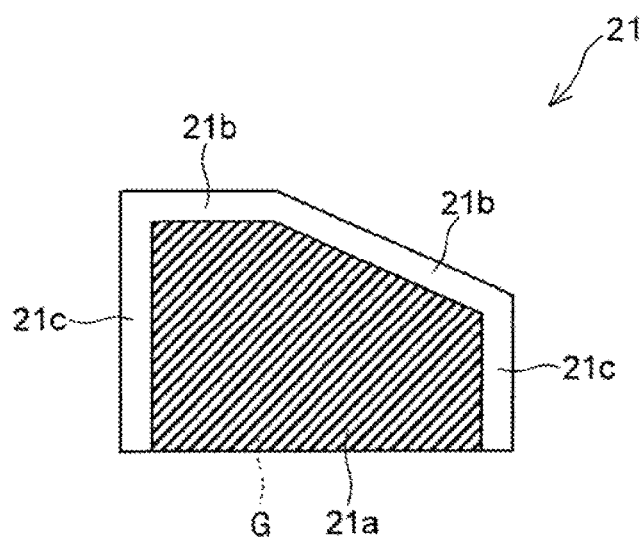
FIG. 15 is a front view illustrating structure of an ink bag of the tipping indicator according to the second embodiment shown in FIG. 11.

Each of the ink bags 21 is for example formed from a film made from a thermoplastic resin such as polyethylene. The ink bag 21 is for example transparent. The ink G is for example red. Therefore, the ink G is visible from outside of the ink bag 21 as illustrated in FIG. 15. The ink bag 21 does not have to be transparent and may be semi-transparent or opaque, or may be subjected to printing on a surface thereof. The ink G (ink chamber 21a) is indicated by hatching in FIG. 15.

A lower edge of the ink chamber 21a (one edge extending in a longitudinal direction) is formed by folding back of the film. An upper edge of the ink chamber 21a is formed by a sealing part 21b at which the film is sealed by heat sealing. Right and left edges of the ink chamber 21a (edges extending in a lateral direction) are formed by sealing parts 21c at which the film is sealed by heat sealing.

The sealing part 21b is a weak sealing section that has a weaker sealing strength than the sealing parts 21c. More specifically, the sealing part 21b is heat sealed at a lower temperature than the sealing parts 21c. For example, the sealing part 21b is heat sealed at approximately 120° C. and the sealing parts 21c are heat sealed at approximately 140° C. Therefore, the ink bag 21 ruptures at the sealing part 21b in response to application of external pressure on the ink bag 21.

The ink bag 21 has a weaker rupture strength than the outer bag 23. In other words, at least the sealing part 21b of the ink bag 21 has a weaker sealing strength than a sealing part 23c of the outer bag 23 explained further below. The ink bag 21 is formed such that when tipping, etc., of the packing box 1 occurs, the ink bag 21 ruptures and the ink G leaks out. In contrast, the outer bag 23 is formed such that the outer bag 23 does not rupture when tipping, etc., of the packing box 1 occurs. Therefore, the ink G can be prevented from leaking out of the outer bag 23. Consequently, contamination of the packing box 1 by the ink G can be prevented.

A manufacturing method of the ink bag 21 involves folding back a film extending in the specific direction (longitudinal direction) at a central part thereof in the lateral direction (part that becomes the lower edge of the ink chamber 21a) and subsequently heat sealing a part that becomes the upper edge of the ink chamber 21a in order to form the sealing part 21b. A tube-shaped film is formed as a result. Next, the sealing parts 21c and the ink chamber 21a are formed by filling an inner part of the film with the ink G while performing heat sealing at specific intervals in the longitudinal direction. Subsequently, the sealing parts 21c are cut at each interval and an unnecessary part outside of (above) the sealing part 21b is cut to manufacture the ink bag 21 including the ink chamber 21a.

Figure 16:
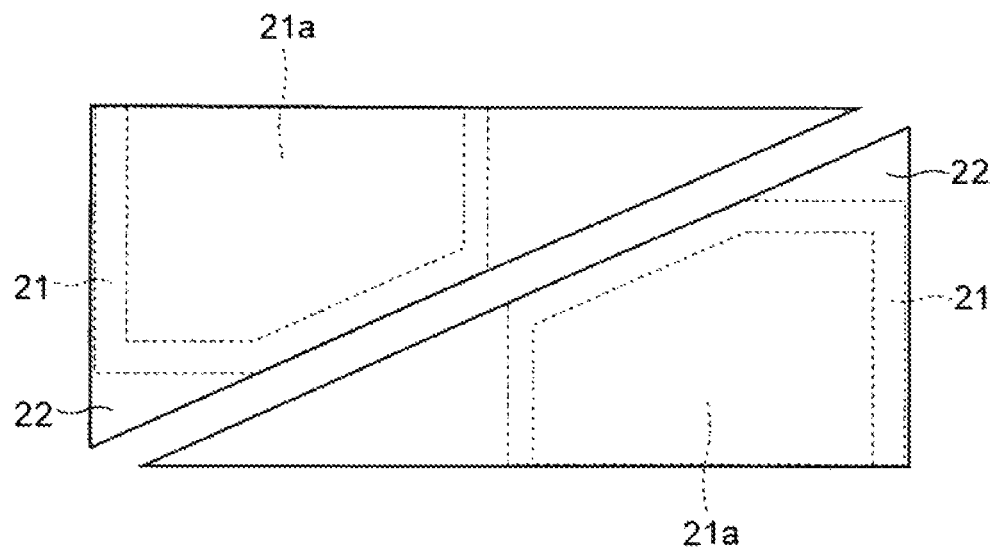
FIG. 16 is a front view illustrating a state in which ink absorbers are located on a front surface side of ink bags of the tipping indicator according to the second embodiment shown in FIG. 11.

As illustrated in FIGS. 12 and 13, each of the ink absorbers 22 is located on a front surface side of the corresponding ink bag 21 (near side in FIG. 12, upper side in FIG. 13). The ink absorber 22 is at least as large as the ink bag 21. The ink absorber 22 is formed from a material that can absorb the ink G (for example, a non-woven fabric). The ink absorber 22 has a different color from the ink G. In other words, the ink absorber 22 is for example a color such as white that enables easy confirmation of a change of color when the ink absorber 22 absorbs the ink G. As a result of the ink absorber 12 being a color such as white, the color of the ink G in the ink bag 21 is barely recognizable when viewed from a side corresponding to the ink absorber 22 as illustrated in FIG. 16.

The outer bag 23 is for example formed from a transparent or semi-transparent film in which a thermoplastic resin layer is laminated onto the surface of a base material formed from PET (polyethylene terephthalate). The outer bag 23 has a substantially rectangular shape that is elongated in the specific direction (left-right direction in FIG. 12). As illustrated in FIGS. 12 and 13, the outer bag 23 has a first storage chamber 23a and a second storage chamber 23b that each enclose an ink bag 21 and an ink absorber 22 therein.

As illustrated in FIG. 12, the first storage chamber 23a and the second storage chamber 23b each have a substantially triangular shape, for example, and each span across the folding position M such as to be located on both sides in the left-right direction. An area of a part of the first storage chamber 23a located on one side (left side) of the folding position M is larger than an area of a part of the first storage chamber 23a located on another side (right side) of the folding position M. An area of a part of the second storage chamber 23b located on the other side (right side) of the folding position M is larger than an area of a part of the second storage chamber 23b located on the one side (left side) of the folding position M.

As illustrated in FIG. 14, in the first storage chamber 23a, the ink chamber 21a of the ink bag 21 is located on only the one side (right side in FIG. 14) of the folding position M. In the second storage chamber 23b, the ink chamber 21a of the ink bag 21 is located on only the other side (left side in FIG. 14) of the folding position M. As illustrated in FIG. 12, in each of the first storage chamber 23a and the second storage chamber 23b, the ink absorber 22 spans across the folding position M such as to be located on both the left and right sides.

Figure 17:
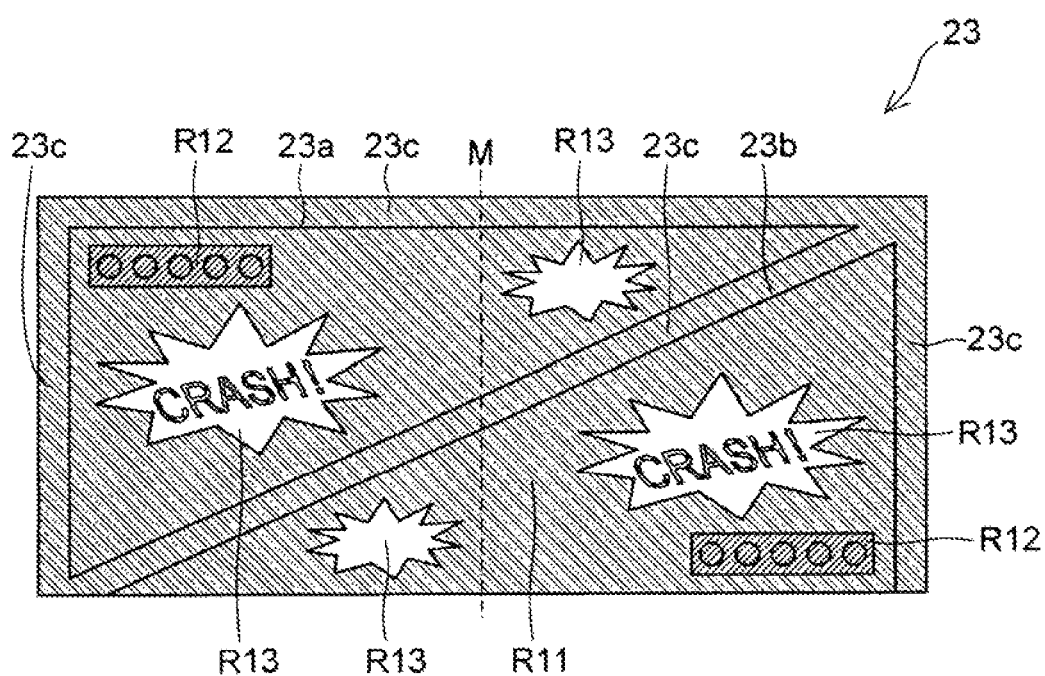
FIG. 17 is a front view illustrating structure of an outer bag of the tipping indicator according to the second embodiment shown in FIG. 11.

As illustrated in FIG. 17, a lower edge of the outer bag 23 (one edge extending in the longitudinal direction (left-right direction in FIG. 17)) is formed by folding back of the film. Upper, left, and right edges of the outer bag 23, and a boundary between the first storage chamber 23a and the second storage chamber 23b are formed by sealing parts 23c at which the film is sealed by heat sealing. Through the above, the first storage chamber 23a and the second storage chamber 23b are each sealed with the corresponding ink bag 21 and the corresponding ink absorber 22 stored therein. The boundary between the first storage chamber 23a and the second storage chamber 23b is oblique to the folding position M. Therefore, the first storage chamber 23a and the second storage chamber 23b each have a width in an up-down direction that differs for the part on the left side (one side) compared to the part on the right side (other side), which easily restricts movement of the corresponding ink bag 21 in the left-right direction.

A front surface of the outer bag 23 is subjected to specific printing as illustrated in FIG. 17. Note that a region that is subjected to printing is indicated by hatching in FIG. 17. More specifically, a region R11 (printed region) that occupies the majority of the front surface of the outer bag 23 is printed on with substantially the same color as the ink absorbers 22 (herein, white). Regions R12 and regions R13 are provided on the front surface of the outer bag 23 on both sides in the longitudinal direction (left-right direction). The regions R12 are printed on with a different color from the region R11. The regions R13 are not subjected to printing. The regions R12 have, for example, a company name or logo printed therein. The regions R13 are regions in which the ink absorbers 22 are visible. The regions R13 are equivalent to an example of the "visual confirmation region".

In each of the first storage chamber 23a and the second storage chamber 23b, the regions R13 are located on both the left and right sides of the folding position M. In the first storage chamber 23a, an area of the region R13 on the left side (one side) of the folding position M is larger than an area of the region R13 on the right side (other side) of the folding position M. In the second storage chamber 23b, an area of the region R13 on the right side (other side) of the folding position M is larger than an area of the region R13 on the left side (one side) of the folding position M. The larger of the regions R13 includes a part therein that has been subjected to printing of substantially the same color as the corresponding ink absorber 22. For example, characters or symbols that attract attention are printed (herein, the characters "CRASH!").

Double-sided adhesive tape 24 is attached to a rear surface of the outer bag 23 as illustrated in FIG. 14. The double-sided adhesive tape 24 adhesively fixes the tipping indicator 20 to a side surface of the packing box 1 (refer to FIG. 11).

As illustrated in FIG. 11, a pair of the tipping indicators 20 is fixed to opposite corners of the packing box 1. The tipping indicators 20 are each folded into an L-shape such that the tipping indicators 20 respectively span across opposite ridge lines L1 and L2 of the packing box 1 (upper box 3). When the packing box 1 is to be transported, an arm of a forklift truck or a hand lift is inserted into the arm insertion holes 9 in the tray-equipped palette 2, and the packing box 1 is then lifted up and transported.

Figure 18:
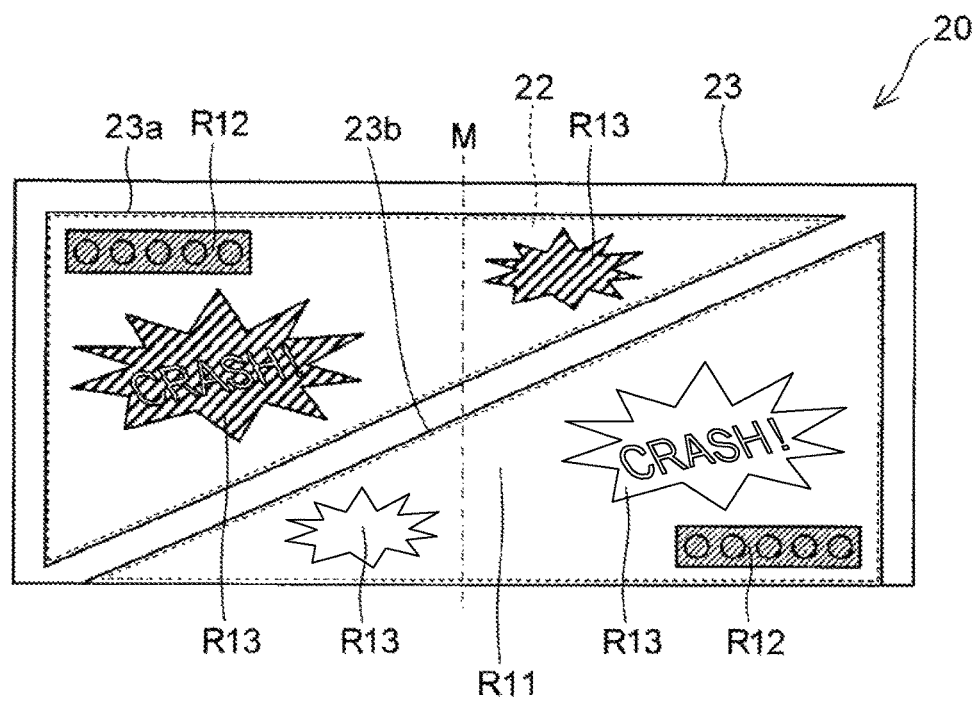
FIG. 18 is a front view illustrating a state in which ink only leaks from an ink bag in a first storage chamber of the tipping indicator according to the second embodiment shown in FIG. 11 and in which only regions R13 in the first storage chamber change color.
Figure 19:
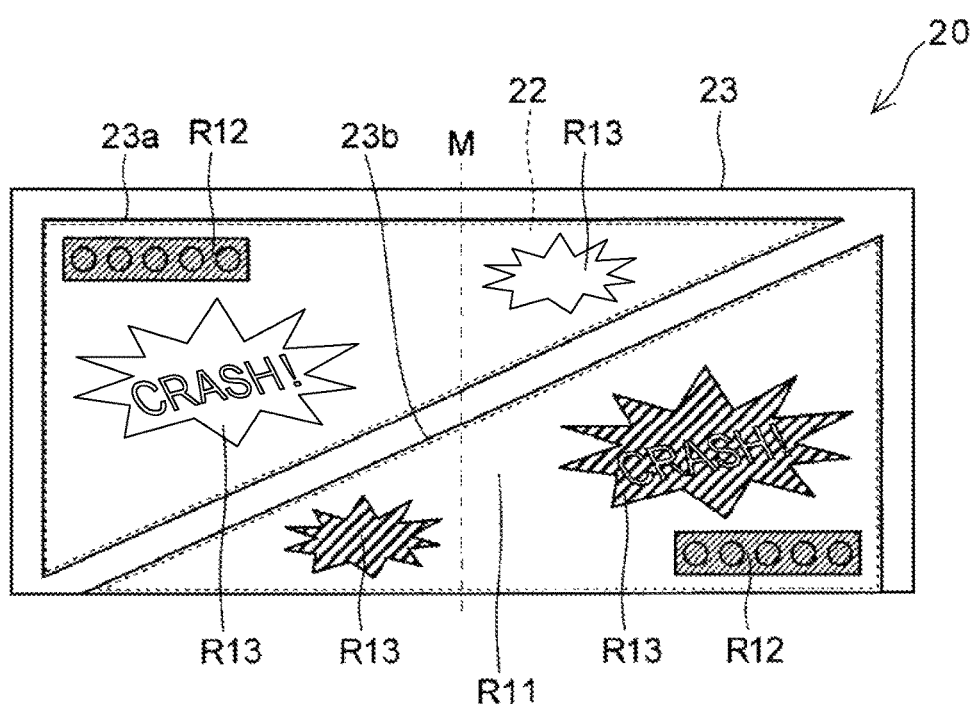
FIG. 19 is a front view illustrating a state in which ink only leaks from an ink bag in a second storage chamber of the tipping indicator according to the second embodiment shown in FIG. 11 and in which only regions R13 in the second storage chamber change color

In a situation in which, during transportation, the packing box 1 for some reason falls from the forklift truck or the hand lifter and tips, pressure is applied on one of the tipping indicators 20, one of the ink bags 21 ruptures, and the ink G leaks out of the ink bag 21. When the above occurs, the ink G that leaks out of the ink bag 21 is absorbed by the corresponding ink absorber 22, causing the ink absorber 22 to change color, for example from white to red. As illustrated in FIGS. 18 and 19, the corresponding regions R13 of the outer bag 23 change color, for example from white to red, and thus the characters printed in the regions R13 (for example, the characters "CRASH!") become clearly visible.

Note that in a situation in which the packing box 1 tips in a direction of a side surface to which the one side (left side) of the tipping indicator 20 is attached, only the ink bag 21 in the first storage chamber 23a ruptures and only the regions R13 in the first storage chamber 23a change color as illustrated in FIG. 18. On the other hand, in a situation in which the packing box 1 tips in a direction of a side surface to which the other side (right side) of the tipping indicator 20 is attached, only the ink bag 21 in the second storage chamber 23b is ruptured and only the regions R13 in the second storage chamber 23b change color as illustrated in FIG. 19.

In the second embodiment, the tipping indicator 20 includes the ink bags 21, the ink absorbers 22, and the outer bag 23 as described above. Each of the ink bags 21 is internally filled with the ink G. Each of the ink absorbers 22 is ink absorptive and has a different color from the ink G. The outer bag 23 is formed from a film within which the ink bags 21 and the ink absorbers 22 are enclosed. The outer bag 23 has the regions R13 in which the ink absorbers 22 are visible. Therefore, an ink bag 21 ruptures and the ink G leaks from the ink bag 21 in a situation in which the packing box 1 tips during transportation or storage of the packing box 1, or in which the packing box 1 is transported in a sideways state. The corresponding ink absorber 22 absorbs the ink G and changes color. Consequently, it is possible to determine that tipping, etc., of the packing box 1 has occurred, even if the packing box 1 is subsequently lifted and returned to an original state. Therefore, in a situation in which the manufactured article (packed article) inside the packing box 1 is damaged, it is easy to determine that the damage to the manufactured article (packed article) has occurred during transportation or storage.

Furthermore, the tipping indicator 20 can be configured by the ink bags 21, the ink absorbers 22, and the outer bag 23. Therefore, compared to the impact sensor-equipped cushioning disclosed in PTL 1, a simple configuration can be implemented through a simplified production process and with reduced production costs. In addition, a reduction in weight can be achieved because it is not necessary to provide a solution throughout cushioning As a result of the tipping indicator 20 being fixed to the side surface of the packing box 1, a person transporting the packing box 1 can recognize that the tipping indicator 20 is present. Therefore, it is expected that an accident is less likely to occur during transportation because the person transporting the packing box 1 will handle the packing box 1 more carefully.

The ink absorbers 22 and the outer bag 23 are foldable into an L-shape. Therefore, a single tipping indicator 20 can be fixed to two adjacent side surfaces of the packing box 1. Consequently, the single tipping indicator 20 can detect tipping, etc., in two directions.

In the second embodiment, the pair of tipping indicators 20 is fixed to opposite corners of the packing box 1 such that the tipping indicators 20 respectively span across opposite ridge lines L1 and L2 of the packing box 1. Therefore, the tipping indicators 20 are fixed to all four side surfaces of the packing box 1. Consequently, one of the tipping indicators 20 is ruptured whichever of the side surfaces of the packing box 1 is underneath when the packing box 1 tips. Therefore, a trace that an impact has occurred is reliably left irrespective of which direction the packing box 1 tips in.

In the first storage chamber 23a, the ink chamber 21a of the ink bag 21 is only located on the one side of the folding position M, whereas in the second storage chamber 23b, the ink chamber 21a of the ink bag 21 is only located on the other side of the folding position M. Therefore, only the ink bag 21 in the first storage chamber 23a or only the ink bag 21 in the second storage chamber 23b ruptures when tipping, etc., of the packing box 1 occurs and, as a result, only the regions R13 in the first storage chamber 23a or only the regions R13 in the second storage chamber 23b change color. Therefore, it is possible to determine which direction the packing box 1 has tipped in.

In each of the first storage chamber 23a and the second storage chamber 23b, the ink absorber 22 is located on both sides of the folding position M. Also, in each of the first storage chamber 23a and the second storage chamber 23b, the regions R13 are located on both sides of the folding position M. Consequently, irrespective of which of the side surfaces having the tipping indicators 20 attached thereto the packing box 1 tips toward, a corresponding ink absorber 22 changes color over two adjacent sides of the packing box 1. Therefore, it is possible to visually confirm that tipping, etc., of the packing box 1 has occurred from either of the two adjacent side surfaces of the packing box 1.

As explained above, in the first storage chamber 23a, the area of the region R13 on the one side is larger than the area of the region R13 on the other side, whereas in the second storage chamber 23b, the area of the region R13 on the other side is larger than the area of the region R13 on the one side. Consequently, a color change occurs over a larger area on a side to which tipping has occurred than on a side to which tipping has not occurred. Therefore, an inspector, etc., can intuitively recognize which direction the packing box 1 has tipped in. In the above manner, the tipping indicator 20 enables recognition of which direction the packing box 1 has tipped in through a single glance from either of the two adjacent side surfaces of the packing box 1.

As explained above, the area of the part of the first storage chamber 23a on the one side is larger than the area of the part of the first storage chamber 23a on the other side, whereas the area of the part of the second storage chamber 23b on the other side is larger than the area of the part of the second storage chamber 23b on the one side. Therefore, the first storage chamber 23a and the second storage chamber 23b can each store a larger ink bag 21. Furthermore, the area of the region R13 on the one side of the first storage chamber 23a can easily be made larger than the area of the region R13 on the other side of the first storage chamber 23a, and the area of the region R13 on the other side of the second storage chamber 23b can easily be made larger than the area of the region R13 on the one side of the second storage chamber 23b.

As explained above, the boundary between the first storage chamber 23a and the second storage chamber 23b is oblique to the folding position M. Therefore, the ink bags 21 in the first storage chamber 23a and the second storage chamber 23b can be easily restricted from moving in the left-right direction.

As explained above, each of the ink bags 21 includes the sealing parts 21b and 21c that seal the periphery of the ink chamber 21a, and the sealing part 21b is a weak sealing section that has a weaker sealing strength than the sealing parts 21c. Therefore, the ink bag 21 reliably ruptures at the sealing part 21b when tipping, etc., of the packing box 1 occurs.

As explained above, the outer bag 23 has the region R11 that has been subjected to printing and that is adjacent to the regions R13 in which the ink absorbers 12 are visible. At least parts of the region R11 that border the regions R13 have substantially the same color as the ink absorbers 22 (the entirety of the region R11 in the second embodiment). Consequently, in a state in which the ink absorbers 22 have not changed color (i.e., a state in which tipping, etc., of the packing box 1 has not occurred), boundaries between the region R11 and the regions R13 are difficult to recognize, and the region R11 and the regions R13 appear to be a single region. Furthermore, in a state in which one of the ink absorbers 22 has changed color (i.e., a state in which tipping, etc., of the packing box 1 has occurred), the corresponding regions R13 change color to a different color from the region R11 such that the regions R13 are visually emphasized. Therefore, reliable visual confirmation that tipping, etc., of the packing box 1 has occurred is possible.

As explained above, part of the regions R13 is subjected to printing of substantially the same color as the ink absorbers 22. Therefore, in a state in which the corresponding ink absorber 22 has changed color (i.e., a state in which tipping, etc., of the packing box 1 has occurred), printing of a different color from the regions R13 (for example, characters or symbols that attract attention) becomes clearly visible in the regions R13. Therefore, reliable visual confirmation that tipping, etc., of the packing box 1 has occurred is possible.

As explained above, the ink absorbers 22 are made from a non-woven fabric. Therefore, the ink absorbers 22 are light and can be made cheaply.

Note that the presently disclosed second embodiment is merely an example in all aspects and should not be construed to be limiting. The scope of the present invention is indicated by the claims, rather than by the above-described second embodiment, and includes all variations that are equivalent in meaning and scope to the claims.

Although the above second embodiment is explained for an example in which only the upper edge of the ink chamber 21a has a weak sealing strength, the present invention is not limited to such an example. The left and right edges or all of the edges of the ink chamber 21a may alternatively have a weaker sealing strength.

Figure 20:
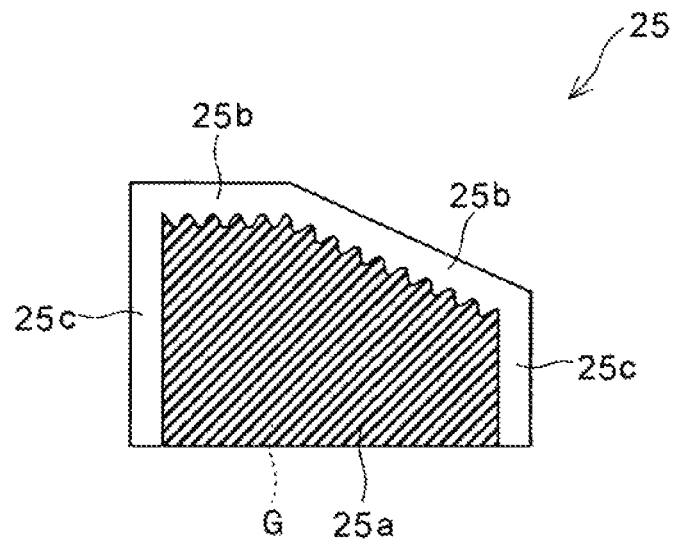
FIG. 20 is a front view illustrating structure of a first variation of the ink bag according to the second embodiment shown in FIG. 11.

Although the above second embodiment is explained for an example in which the sealing strength of the sealing part 21b is weakened through heat sealing at a low temperature, the present invention is not limited to such an example. The sealing strength of a sealing part can alternatively be weakened through the type of film or the shape of the sealing part. For example, in an ink bag 21 according to a first variation of the present invention illustrated in FIG. 20, a sealing part 21b has a weaker sealing strength because the sealing part 21b is wave-shaped. Therefore, rupturing can occur more reliably at the sealing part 21b when tipping, etc., of the packing box 1 occurs. The sealing strength of a sealing part can also be weakened through viscosity of the ink G. More specifically, during formation of the sealing parts 21c, heat sealing is performed while pressing films together such that ink G present between the films is pushed out. The ink G is less readily pushed out from between the films in a situation in which an ink G has higher viscosity. Therefore, the sealing strength of the sealing parts 21c can be made approximately the same or weaker than the sealing strength of the sealing part 21b by using an ink G having higher viscosity.

Although the above second embodiment is explained for an example in which the periphery of each of the ink chambers 21a is sealed by heat sealing, the present invention is not limited to such an example. For example, the periphery of each of the ink chambers 11a may be sealed by a zipper (also referred to as a zip or a fastener) or the like. The sealing strength of a sealing part can also be easily weakened in such a situation.

Although the above second embodiment is explained for an example in which one type of ink bag 21 is used, the present invention is not limited to such an example. For example, in a situation in which a plurality of different types of ink bags 21 having different rupture strengths are used and in which a different color ink G is used for each of the rupture strengths, the strength of impact can be determined based on which color an ink absorber 22 changes to.

Although the above second embodiment is explained for an example in which the front surface of the outer bag 23 has been subjected to printing, the present invention is not limited to such an example. The front surface of the outer bag 23 may alternatively not have been subjected to printing. In other words, the entire surface of the outer bag 23 may be transparent or semi-transparent.

Although the above second embodiment is explained for an example in which each of the ink absorbers 22 spans across the folding position M, ink absorbers 22 located separately on both sides of the folding position M may alternatively be provided. In such a situation, the outer bag 23, the ink absorbers 22, etc., are preferably formed such that the ink absorbers 22 do not move in the left-right direction within the first storage chamber 23a or the second storage chamber 23b.

Figure 21:
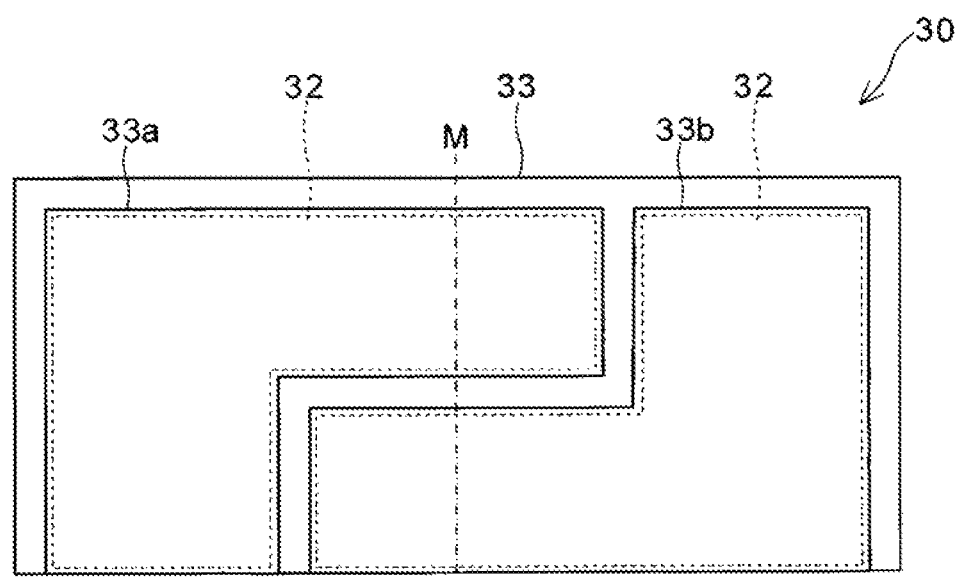
FIG. 21 is a front view illustrating structure of a second variation of the tipping indicator according to the second embodiment shown in FIG. 11.
Figure 22:
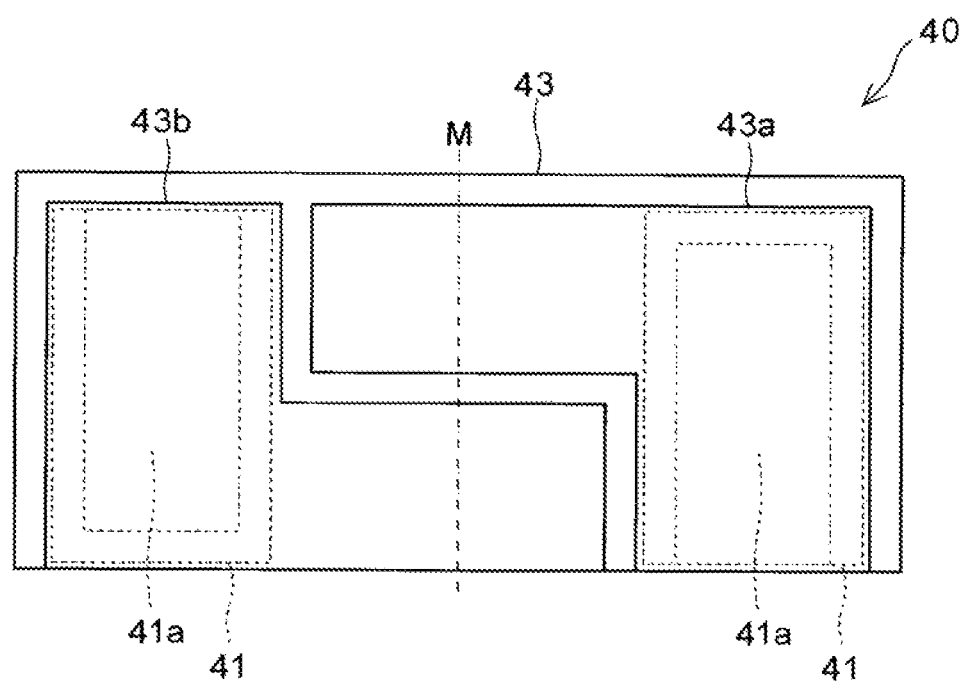
FIG. 22 is a rear view illustrating structure of the second variation of the tipping indicator according to the second embodiment shown in FIG. 11.

Although the above second embodiment is explained for an example in which the boundary between the first storage chamber 23a and the second storage chamber 23b is oblique to the folding position M, the present invention is not limited to such an example. For example, a boundary between a first storage chamber 23a and a second storage chamber 23b may have a stepped-shape such as in a tipping indicator 20 according to a second variation of the present invention illustrated in FIGS. 21 and 22. In such a situation, the first storage chamber 23a and the second storage chamber 23b each have a part on one side and a part on another side that differ in terms of width in the up-down direction and, as a result, an ink bag 21 is easily restricted from moving in the left-right direction. Note that the double-sided adhesive tape 24 is omitted in FIG. 22. A boundary between a first storage chamber 23a and a second storage chamber 23b may alternatively be parallel to upper and lower edges of the first storage chamber 23a and the second storage chamber 23b. In other words, the first storage chamber 23a and the second storage chamber 23b may each have a thin substantially rectangular shape and may be arranged in the up-down direction.

The above second embodiment is explained for an example in which, in each of the first storage chamber 23a and the second storage chamber 23b, the region R13 (visual confirmation region) on the side on which the ink chamber 21a is located has a larger area so that it is possible to intuitively recognize the direction in which tipping, etc., of the packing box 1 has occurred. However, the present invention is not limited to such an example. The regions R13 on the left and right sides may alternatively be the same size. In such a situation, the outer bag 23 may be subjected to printing that indicates a tipping direction (for example, the characters "Left side surface impact detection window") in the regions R13 or in proximity thereto. Through such a configuration, an inspector, etc., can easily recognize in which direction tipping, etc., of the packing box 1 has occurred, even if the first storage chamber 23a, the second storage chamber 23b, and the regions R13 are the same size on both the left and right sides. Note that printing indicating the tipping direction may be performed even in a situation in which the first storage chamber 23a, the second storage chamber 23b, and the regions R13 are different sizes on the left and right sides as in the above embodiment.

A configuration obtained through appropriate combination of configurations of the above-described second embodiment, first variation, and second variation is also included in the technical scope of the present invention.

In the above first and second embodiments, as explained using FIG. 1, the side wall 5b of the tray 5 has a flap-shape that is foldable relative to the bottom surface 5a, and the side wall 5b is stood up after covering with the upper box 3 and is connected to the upper box 3 with fasteners. Alternatively, the side wall 5b may be partly or entirely omitted and the tray-equipped palette 2 may be fixed to the upper box 3 by a tie-band or the like. In the above first and second embodiments, as explained using FIG. 1, an example is given in which the packing box 1 includes the tray-equipped palette 2 formed by the tray 5 and the palette 6. However, the present invention can of course also be applied in the same way to a packing box 1 formed by an upper box 3 and a tray 5, without a palette 6.

The invention claimed is:

1. A tipping indicator for fixing to a side surface of a packing box, the tipping indicator comprising:
    an ink bag including an ink chamber internally filled with an ink;
    an ink absorber that is ink absorptive and that has a different color from the ink; and
    an outer bag formed from a film within which the ink bag and the ink absorber are enclosed, wherein
    at least part of the outer bag has a visual confirmation region in which the ink absorber is visible,
    the outer bag includes a first storage chamber and a second storage chamber that enclose the ink absorber therein,
    the ink absorber and the outer bag are foldable into an L-shape,
    the first storage chamber and the second storage chamber each span across a folding position,
    in the first storage chamber, the ink chamber of the ink bag is located on only one side of the folding position,
    in the second storage chamber, the ink chamber of the ink bag is located on only another side of the folding position,
    in the first storage chamber and the second storage chamber, the ink absorber is located on both the one side and the other side of the folding position, and
    in the first storage chamber and the second storage chamber, the visual confirmation region is located on both the one side and the other side of the folding position.

2. The tipping indicator according to claim 1, wherein
the ink bag includes a sealing part that seals a periphery of the ink chamber, and
the sealing part includes a weak sealing section that has a weaker sealing strength than another section of the sealing part.

3. The tipping indicator according to claim 1, wherein
the outer bag has a printed region that has been subjected to printing and that is adjacent to the visual confirmation region, and
at least a part of the printed region that borders the visual confirmation region has substantially the same color as the ink absorber.

4. The tipping indicator according to claim 3, wherein
the visual confirmation region includes a part therein that has been subjected to printing of substantially the same color as the ink absorber.

5. The tipping indicator according to claim 1, wherein
the ink absorber is made from a non-woven fabric.

6. The tipping indicator according to claim 1, wherein
the ink bag, the ink absorber, and the outer bag are foldable into an L-shape.

7. The tipping indicator according to claim 6, wherein
the ink chamber is provided as a plurality of ink chambers that are located separately on both sides of a folding position.

8. The tipping indicator according to claim 6, wherein
the ink absorber spans across a folding position.

9. The tipping indicator according to claim 1, wherein
in the first storage chamber, an area of the visual confirmation region on the one side of the folding position is larger than an area of the visual confirmation region on the other side of the folding position, and
in the second storage chamber, an area of the visual confirmation region on the other side of the folding position is larger than an area of the visual confirmation region on the one side of the folding position.

10. The tipping indicator according to claim 1, wherein
an area of a part of the first storage chamber located on the one side of the folding position is larger than an area of a part of the first storage chamber located on the other side of the folding position, and
an area of a part of the second storage chamber located on the other side of the folding position is larger than an area of a part of the second storage chamber located on the one side of the folding position.

11. The tipping indicator according to claim 1, wherein
a boundary between the first storage chamber and the second storage chamber is oblique to the folding position or has a stepped-shape.

12. The tipping indicator according to claim 1, wherein
the ink bag includes a sealing part that seals a periphery of the ink chamber, and
the sealing part includes a weak sealing section that has a weaker sealing strength than another section of the sealing part.

13. The tipping indicator according to claim 1, wherein
the outer bag has been subjected to printing that indicates a tipping direction.

14. A packing box having the tipping indicator according to claim 1 fixed thereto.

* * * * *